April 23, 1946.  H. ZIEBOLZ  2,398,988
APPARATUS FOR DETECTING TRENDS IN OBSERVED DATA
Filed March 11, 1943  4 Sheets-Sheet 1

INVENTOR.
Herbert Ziebolz,
BY
his Atty.

April 23, 1946. H. ZIEBOLZ 2,398,988
APPARATUS FOR DETECTING TRENDS IN OBSERVED DATA
Filed March 11, 1943 4 Sheets-Sheet 2
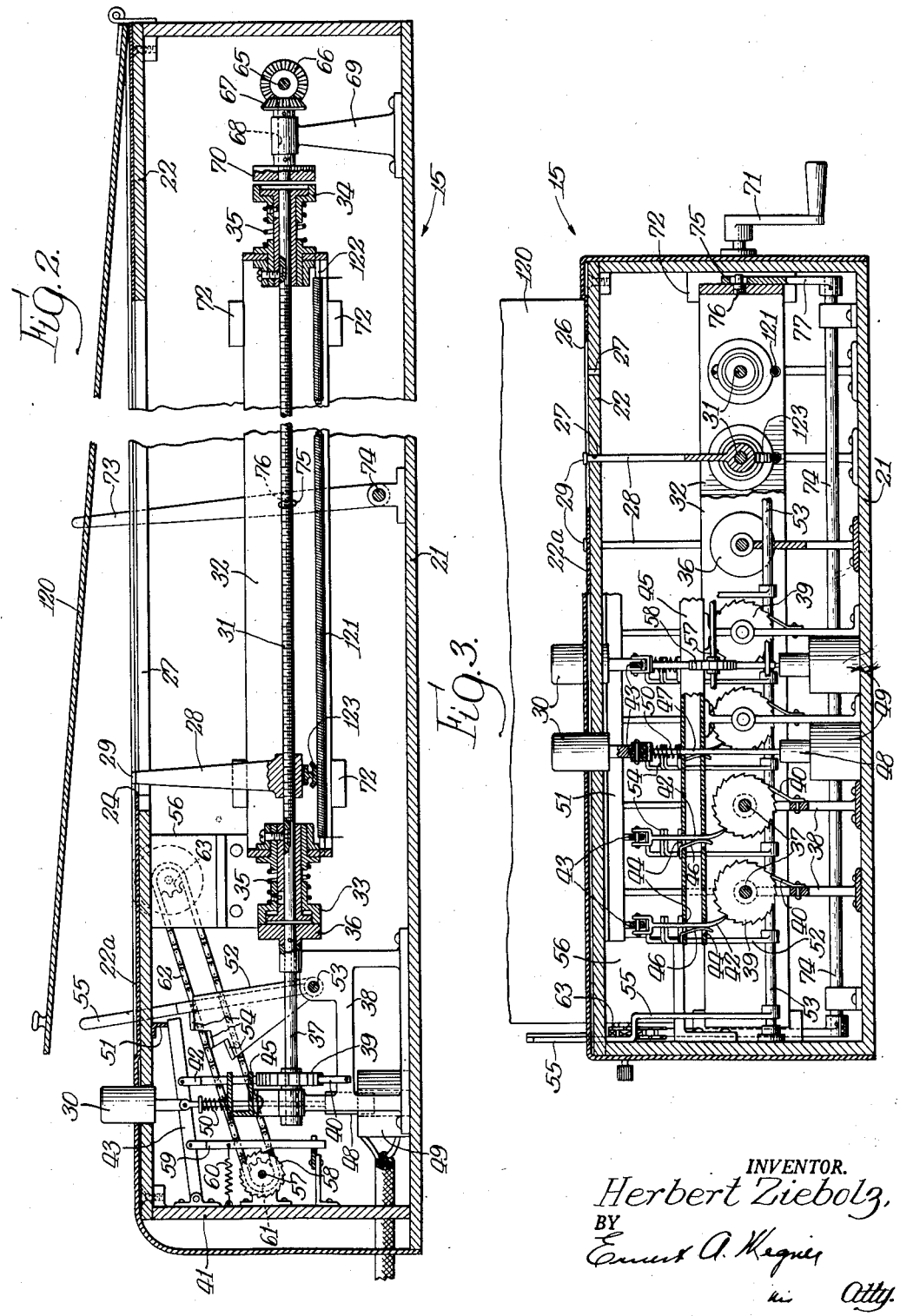
INVENTOR.
Herbert Ziebolz,
BY
Ernest A. Kegney
his Atty.

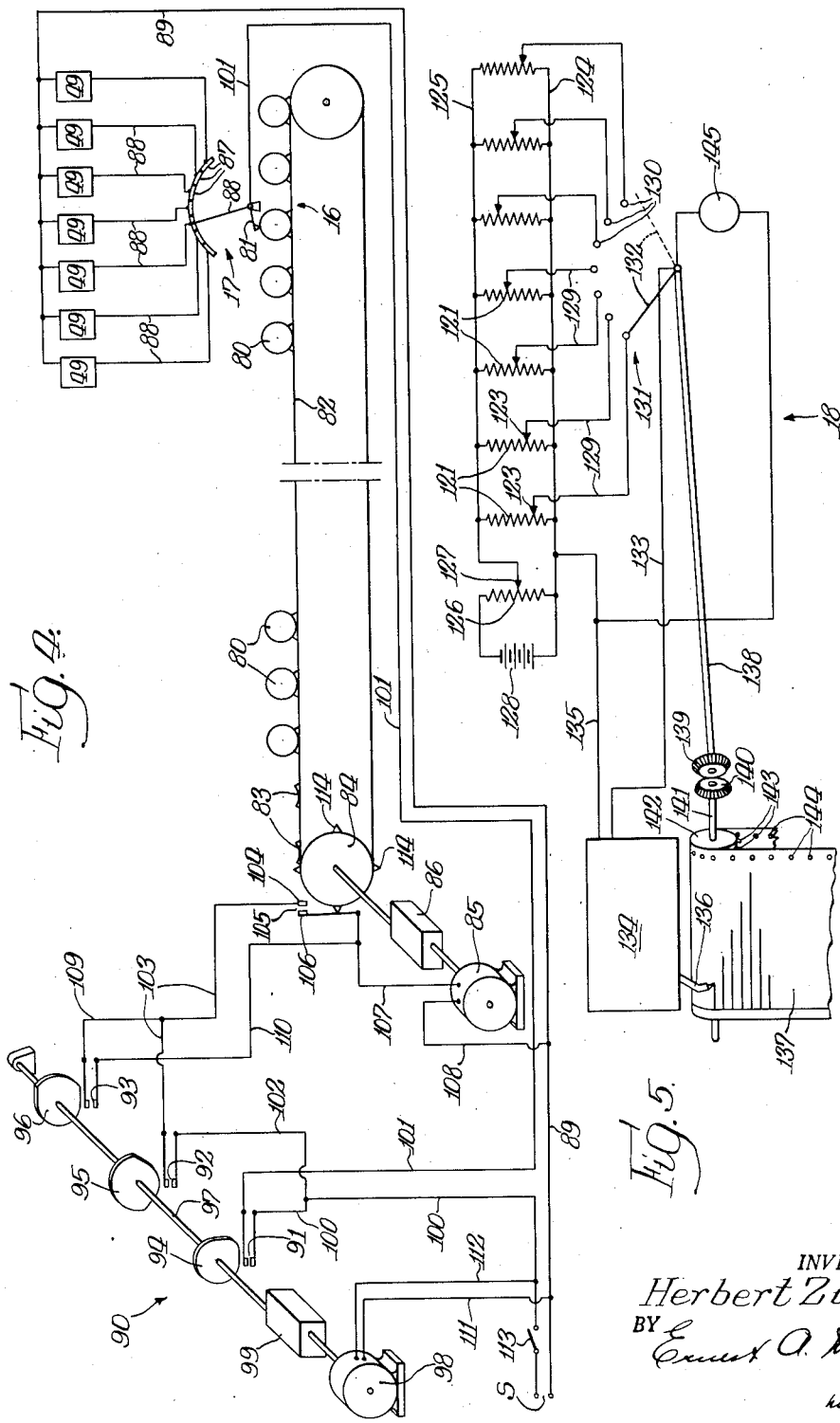

April 23, 1946. H. ZIEBOLZ 2,398,988
APPARATUS FOR DETECTING TRENDS IN OBSERVED DATA
Filed March 11, 1943 4 Sheets-Sheet 4
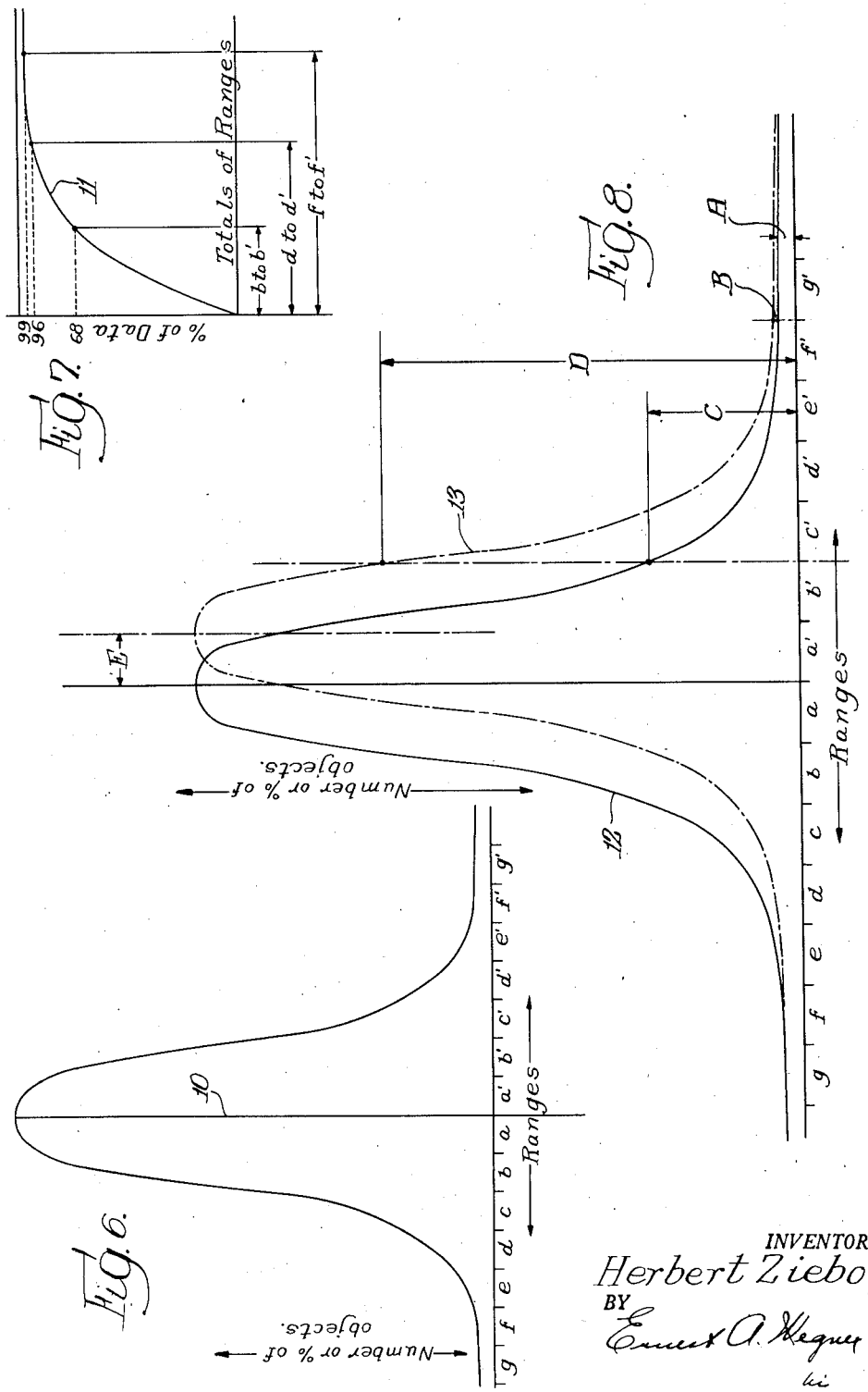
INVENTOR.
Herbert Ziebolz.

Patented Apr. 23, 1946

2,398,988

UNITED STATES PATENT OFFICE 2,398,988

APPARATUS FOR DETECTING TRENDS IN OBSERVED DATA

Herbert Ziebolz, Chicago, Ill., assignor to Askania Regulator Company, Chicago, Ill., a corporation of Illinois Application March 11, 1943, Serial No. 478,772

4 Claims. (Cl. 177—311)

The invention relates generally to apparatus for detecting trends in observed data and relates more particularly to apparatus for supervising a manufacturing operation.

One object of the invention is to provide a new and improved apparatus for detecting trends in observed data relating to a variable condition.

Another object is to provide a new and improved apparatus for forecasting infrequent occurrences or changes in the end results of a condition by detecting trends in observed data relating to the more frequent or common occurrences of a condition.

Another object is to provide a new and improved apparatus for supervising a manufacturing operation particularly of predicting a change in results, such as an increase in rejects, before the change occurs and while correction in the manufacturing operation may still be made to avoid the results.

A further object is to provide apparatus particularly adapted for employment in a method of detecting trends and predicting changes in a condition by periodically graphing the observed data on a coordinate axis graph in which the abscissa axis is subdivided into a plurality of equal ranges of a measure of a characteristic to which the observed data relates and in which the ordinate values are numbers or percentages of units of data falling into each range, and comparing the ordinate values of the graphs for a common abscissa point chosen near the true average line of one of the graphs, or comparing the position of the true average lines of the graphs.

Yet another object is to provide an apparatus for automatically mechanically producing a graph of the character described including means for classifying the observed data.

Other objects and advantages will become apparent from the following detailed description taken in connection with the accompanying drawings, in which:

Fig. 2 is a longitudinal vertical sectional view taken approximately along the line 2—2 of Fig. 1.

Fig. 3 is a staggered transverse vertical sectional view taken approximately along the line 3—3 of Fig. 1.

Fig. 4 is a diagrammatic view illustrating an automatic data obtaining and classifying means forming a part of the invention.

Fig. 5 is a diagrammatic view illustrating means for recording on a variable scale the graph produced by the device illustrated in Fig. 1.

Figs. 6, 7 and 8 are graphs illustrating the invention.

Figure 1:
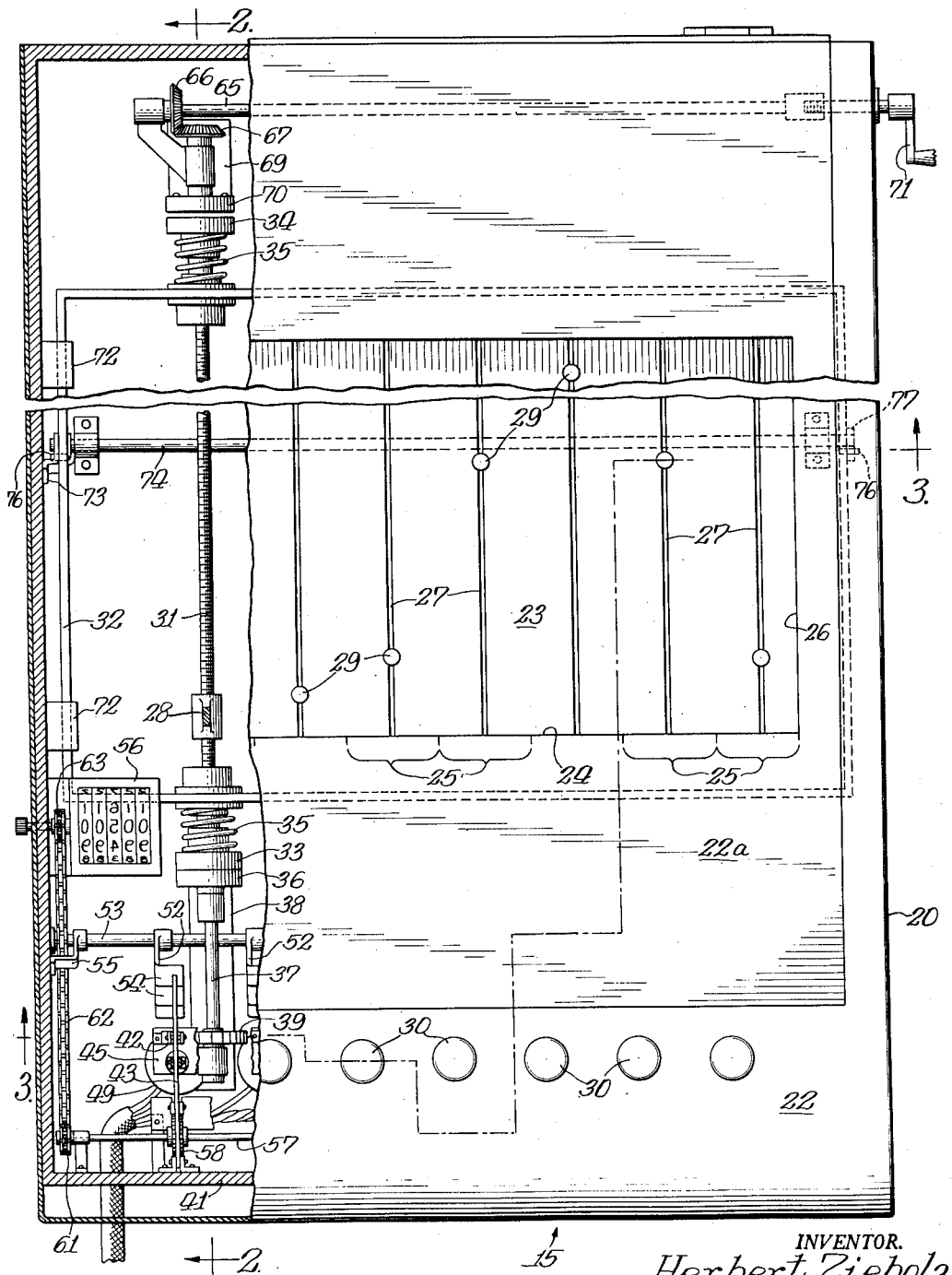
Fig. 1 is a mechanical graphing device employable in and embodying features of my invention. The figure is broken and has a portion of the casing broken away to reveal certain interior structure.

For purposes of disclosure, particularly of means for practicing the method, there has been shown and will hereinafter be described a preferred embodiment and the method will in large part be disclosed in the description of the operation of the apparatus. It is not intended, however, that the invention is to be limited to the particular embodiment disclosed. On the contrary, it is intended to cover all modifications and alternative constructions falling within the spirit and scope of the invention as defined in the appended claims.

It is known that if some variable characteristic of a plurality of like natural objects, such as the height or weight of men or women, the size or weight of eggs or rain drops, and so forth, is subdivided into a plurality of equal ranges of a measure of that characteristic and plotted along the abscissa axis of a coordinate axis graph and the number of objects whose observed characteristic falls within each range are plotted as ordinates on that graph, there results a typical distribution curve, usually the so-called normal or probability curve. Such a normal curve is, by way of example, illustrated in Fig. 6 wherein the abscissa axis of the graph has been subdivided into a plurality of equal ranges, herein arbitrarily designated $a$ to $g$ and $a'$ to $g'$ respectively and progressively to the left and to the right from a line 10 drawn through the apex of the curve and parallel with the ordinate axis. Such a line 10 incidentally indicates the true average value of the objects or specimens observed and the curve shows the distribution of the specimens to one side or the other of the true average value. I have discovered that under normal and proper conditions manufactured or processed articles or products, when similarly observed and the data plotted, produce a generally similar curve.

The extremities of such a normal curve theoretically continue to infinity and thus are approximately parallel with the abscissa axis. The extremities also lie very close to the abscissa axis because the relative number of specimens that fall within the ranges remote from the true average are few. Since the normal curve is characterized (see Fig. 6) by a rather steep-sided midportion and rapidly flattening extremities, even the number of specimens falling in ranges comparatively close to the true average are few.

This is best seen from Fig. 7. The curve 11 of Fig. 7 results from plotting the percentage of units of data or specimens as ordinates against totals of ranges as abscissae progressively from the true average line outwardly. Thus it will be seen that the central four ranges a, b, a' and b' contain sixty-eight percent of the units of data, the central eight ranges d to d' contain ninety-six per cent of the units of data, a mere increase of twenty-eight per cent, though the number of ranges was doubled. Adding the next two ranges on either side so as to extend from f to f', inclusive, ninety-nine per cent of the units of data fall within these ranges. This is only an increase of three per cent even though another four ranges were added. The most striking fact, however, is that only one per cent of the units of data fall within the ranges lying beyond the ranges f, f'.

In the manufacture or processing of articles or products, as well as in other business conditions, it frequently is the end results that are of interest. In terms of a manufacturing operation, it is the products falling at the extremities or flattened portions of the normal curve, that is, the under or over sizes, or those that are too hard or too soft, that are of interest. It is not at all uncommon that the tolerances allowed in a finished product would include the ranges d to d' of the graph of Fig. 6, and might even include the ranges f to f'. However, assuming that the tolerances allowed include only the ranges d to d', it follows that only four per cent of the finished products would fall outside of the tolerances. If thus in a manufacturing operation the finished products are periodically sampled and tested only for the extreme over or under sizes, for example, the possibility of detecting any deviation from desired or given specifications would be remote and very retarded. If, on the other hand, every finished product were tested the expense in time and labor involved might be prohibitive.

My method permits of an observation in the trend of observed data and, more particularly, permits the prediction of a change in the end results, that is, of these infrequently occurring observations or finished products, by the observation of frequently occurring data and the observation of changes which are magnified in relation to the minor change occurring in the infrequently occurring data or products. This method, moreover, may be carried out by periodic sampling of the observed data or of the finished products, and thus obviates the expense in time and labor linvolved in a checking of all of the observed data or all of the finished products above pointed out as necessary if a change in trend is to be detected by observation of the outsize products or units of data only. Accordingly, it is a first step in my method to divide a measure of a variable characteristic to be observed into a plurality of equal ranges and laying those ranges off along the abscissa axis of a coordinate axis graph, such ranges to include the limits of tolerance within which the variable characteristic is to fall. A sampling of the observed data or, in the case of a manufacturing operation, of the finished products, is then taken, the finished products checked as to the particular characteristic and the data thus obtained classified as to the particular ranges into which the data falls, and then plotted with the number of units of data in each range as ordinate values of the graph. There will result under normal conditions the curve 12 shown in Fig. 8. The products in the sampling may contain specimens falling in the ranges g, g' or beyond, giving actual points on the curve outwardly of the ranges f, f'. On the other hand, in a small sampling there may be no products falling in the ranges g, g' or beyond, in which event the curve 12 is arbitrarily projected in conformity with the usual normal curve shown in Fig. 6. At a subsequent time in the manufacturing operation, another sampling of the finished products is taken, the products checked as to the particular characteristic, the data so obtained classified as to the particular range in which it falls, and then plotted on the same graph with the units of data in each range as ordinate values. If there has been some change in the operation, for example, if some grinding wheel has become worn, there may result a curve such as represented at 13 in Fig. 8. If the range f' is considered as the outside limit of the tolerance in one direction, it will be seen from Fig. 8 that the number of rejects at the time of the first sampling is represented by the ordinate value of the curve 12 at the dividing line between the range f' and g', this ordinate value herein being designated as A. Similarly, the rejects at the later time are represented by the ordinate value of the curve 13 at the same point. Here again the sampling may or may not contain products falling in the range g' or beyond, and thus again the curve 13 may have to be projected to indicate the number or percentage of rejects to be expected from the manufacturing operation as it is proceeding at that time. Consequently, whether the curve 13 is projected or whether the sampling did contain a very small percentage of products falling in the range g' or beyond, the curve 13 at the dividing line between the ranges f' and g' being at the flattened portions of the curves will be likely to coincide or very nearly coincide with the curve 12. At the most, the ordinate value of the curve 13 at the dividing line between the ranges f' and g' would exceed the ordinate value of the curve 12 at that point by the slight amount indicated by the letter B. Thus it will be seen that if the products are being checked only for those falling beyond the limits of tolerance, or even if the graphs produced by this method are observed only at the limits of tolerance, the possibilities of noting a change in the manufacturing operation sufficiently in advance to permit adjustment to avoid an excessive amount of rejects is not possible or at least would be a matter of chance.

My method, therefore, involves the additional steps of comparing values that have a large change for a comparatively minor change in the end results, and thus permit the ready detection of a trend in the observed data, and hence of the manufacturing operation, and also permits prediction of an increased number of rejects certain in the future if the operation continues in that same direction. This permits adjustment or correction in the operation to be made before an excessive percentage of rejects are produced. Herein this additional step may be either or both of two comparisons or observations. The first and preferred comparison is that of the ordinate values of the graphs 12 and 13 at some abscissa value chosen near the true average line of one of the graphs, preferably the first of two graphs resulting from the method herein described. Thus, if an abscissa value be chosen, for example, the point representing the dividing line between the ranges b' and c', the ordinate value for the curve 12 is represented by C, whereas the ordinate value for the same point on the curve 13 is represented by D. It is readily seen that this latter value D is more than twice the value C and thus is readily detected and, moreover, occurs with even a slight change in the manufacturing operation or observed data. This more than doubled value is in contrast with the change at the limit of the tolerance represented by the increase B, which is in the order of one-tenth or one-hundredth of the value represented by A. The alternative comparison is that of the lateral shift of the true average line. In Fig. 8 this shift is represented by E and is in the order of ten times the value represented by B. Thus by this alternative step a trend in the observed data is also readily detected and from which changes in the end results, that is, in the case of a manufacturing operation, of rejects, predicted sufficiently in advance to permit correction of the factor working toward the production of the excessive percentage of rejects.

It is believed apparent from Fig. 8 that it is even possible to detect trends in observed data and to predict changes in end results by the graphing of data for a limited number or even a single range of a measure of the characteristic being observed. Thus, as shown in Fig. 8, it would only have been necessary to plot the data falling in the ranges $b'$ and $c'$, or either one of those ranges. There still would have been shown by such plotting of data either the ordinate value change represented by D over C, in the event two ranges were employed, or a comparable change in ordinate value would have been indicated if data had been plotted for but one of the ranges.

While the method may be practiced manually or by a variety of apparatus, there is herein shown and will now be described one such apparatus. This apparatus comprises generally a mechanical graphing device, generally designated 15, data obtaining means 16, data classifying means 17, and means 18 for recording on a variable scale the graph produced by the graphing device 15. The apparatus as herein disclosed is adapted for use in conjunction with a manufacturing operation, more particularly, one where the product is to conform to certain specifications as to size, for example, wrist pins. The data obtaining means 16 thus herein takes the form of a measuring mechanism, but it is to be understood that it may, of course, take a variety of forms such, for example, as a mechanism for checking hardness, density, or any other characteristic or quality of a product.

The graphing device 15 is of the general type disclosed and claimed in my copending application Serial No. 436,020, filed March 24, 1942. It comprises generally a box-like, metallic casing or housing 20 having a base 21 and a top wall or plate 22. The top plate 22 has a rectangular, depressed portion 22a and within it a rectangular, sub-depressed portion 23, the lower marginal edge 24 of which is subdivided into a plurality of equal divisions 25 representing ranges of some measure of a characteristic, dimension or the like. This marginal edge 24 may be considered as the abscissa axis of a coordinate axis graph, the ordinate axis being represented by the side marginal edge 26. Since only the relative, rather than absolute, ordinate values are here desired the marginal edge 26 need not be graduated. Formed in the plate 22 in the sub-depressed portion 23 thereof are a plurality of parallel, equally spaced slots 27 parallel with the marginal edge 26 and each located at the midpoint of one of the ranges or divisions 25. The sub-depressed portion 23 may thus be considered as presenting a chart face with the slots 13 forming predetermined abscissa values.

Housed within the casing and projecting through and movable longitudinally in each slot 27 is an indicating finger 28 (see Fig. 3) having an exposed head 29. The heads 29 are centered with respect to the slots 27 in order that they may represent the same properly spaced abscissa values represented by the slots 27. These fingers 28 are adapted to be actuated either by individual push buttons 30 or automatically under the control of the data classifying means 17, as will be described hereinafter. Therefore, after determining the ranges into which the variable or characteristic to be charted is to be subdivided, the ranges are assigned in consecutive order to the divisions 25 and hence to the corresponding fingers 28. Each of the fingers 28 is to be advanced step-by-step from a zero position as units of data fall within the particular range represented by a finger, so that the ultimate position of each finger represents the total number of units of data, that is, items with a specific characteristic falling into each range.

To that end, each finger 28 is mounted in threaded engagement with a threaded shaft 31 extending longitudinally of the casing and rotatably journaled near its ends in a rectangular frame 32, the finger being held against rotation with the shaft by the slot 27 through which it projects. Each shaft 31 projects at its ends through the frame 32 and at the front or left end, as viewed in Fig. 2, carries a clutch element 33, and at its rear or right hand end, as viewed in Fig. 2, carries a frictional clutch element 34. Each of the clutch elements is nonrotatably mounted on the shaft 31 but is mounted for limited relative longitudinal movement and is urged by spring 35 toward the respective ends of the shaft to assure proper engagement with complementary clutch elements presently to be described. Complementing the clutch elements 33 are a plurality of cooperating clutch elements 36, one for each of the clutch elements 33, and disposed in axial alignment with the shafts 31. These clutch elements 36 constitute a part of step-by-step actuating mechanism for the fingers 28. To that end each of the clutch elements 36 is nonrotatably secured on the end of a stub shaft 37 appropriately journaled in a L-shaped bracket 38 upstanding from the base 21. Also nonrotatably secured on each stub shaft 37 is a ratchet wheel 39 yieldably held against rotation by a spring detent 40. Cooperating with each ratchet wheel 39 is a pawl 42 pivotally and pendently supported from a lever 43 pivoted at one end on a plate 41, and extending from that plate longitudinally toward the rear of the casing. Each pawl 42 projects through and is guided in slots 44 formed in a channel member 45 extending transversely of the casing. A spring 46 urges each pawl 42 into engagement with the ratchet wheel 39, while sufficient play is provided in the mounting to permit the pawl to swing laterally as it moves downwardly to rotate its ratchet wheel.

As has already been stated, the graphing device may be actuated manually through push buttons 30 or automatically. To permit actuation of the fingers 28 through the push buttons 30, each push button is pivotally connected to one of the levers 43, as best seen in Figs. 2 and 3. Depending from this same point on each lever 43 is a bar 47 terminating at its upper end in a yoke by means of which it is pivotally connected to the lever 43, and at its lower end carrying the core 48 of a solenoid 49. The bar 47 passes through and is guided by apertures in the channel member 45, while interposed between the channel member and the yoke at the upper end of the bar is a compression spring 50 urging the lever 43 upwardly to the extent permitted by an angle iron stop 51. Thus it will be seen that by depression of a button 30 or by energization of a solenoid 49, a ratchet wheel 39 will be rotated and, through stub shaft 37 and clutch elements 36 and 33, such rotation will be imparted to the shaft 31 which in turn will advance the finger 28 associated therewith.

Means is provided for advancing the fingers 28 varying amounts for a single actuation of a lever 43, whether that be by manipulation of a button 30 or energization of a solenoid 49. This means takes the form of a stop adjustable variably to limit the extent of the actuating movement of the levers 43. Herein this comprises a plurality of plates 52 rigid on a shaft 53 extending transversely of the casing, each formed with a plurality of lateral offsets 54 at varying radial distances from the shaft 53. The plates 52 are so spaced along the shaft 53 that one of the plates is in position to have its lateral offsets 54 struck by each of the levers 43. Rigid with the shaft 53 and projecting outwardly of the casing is a lever 55 by means of which the plates 52 are adjusted to obtain a rotation of one, two or three teeth of a ratchet wheel 39 for each actuation of a lever 43. A counter or register 56 is provided for recording the total number of actuations of all the levers 43. To that end there extends transversely of the casing a shaft 57 carried by the plate 41 and in turn carrying nonrotatably thereon a ratchet wheel 58 for each lever 43. Pivotally and pendently supported from each lever 43 is a second pawl 59 which is by a tension spring 60 urged into engagement with a ratchet wheel 58. This second pawl 59 is so supported that the shaft 57 is rotated to the extent of one tooth only with each actuation of a lever 43 regardless of the extent of movement of the lever 43 as permitted by adjustment of the plates 52. At its left hand end, as viewed in Fig. 1, the shaft 57 has nonrotatably secured thereto a sprocket wheel 61 which, through the medium of a chain 62 and a sprocket wheel 63 fast on the shaft of the counter 56 advances the counter one unit for each actuation of a lever 43.

Means is provided for returning all of the fingers 28 to zero position to condition the graphing device for a graphing operation. To that end there extends transversely of the casing at the rear end thereof a shaft 65 having nonrotatably secured thereto at appropriately spaced intervals a plurality of bevel gears 66. Each of the gears 66 meshes with a bevel gear 67 on one end of a stub shaft 68 journaled in a support 69. The remaining end of each stub shaft 68 has nonrotatably secured thereto a frictional clutch element 70 in axial alignment with the shafts 31. One end of the shaft 65 projects outwardly of the casing and at that end has secured thereto a crank 71 whereby the clutch elements 70 may be rotated through the train of gearing just described. In order that all of the clutches 34 and 70 may be simultaneously engaged and in order that the clutches 33 and 36 may be simultaneously disengaged, the frame 32 is mounted for limited longitudinal movement in guides 72. Shift of the frame 32 longitudinally in either direction is effected through the medium of a lever 73 projecting outwardly of the casing 20 and at its inner end rigid with a shaft 74 extending transversely of the casing. At a point opposite the frame 32, the lever 73 is formed with a longitudinal slot 75 into which projects a screw 76 carried by the frame 32. A similar screw 76 carried by the opposite side of the frame 72 projects into a slot formed in an arm 77 fast on the opposite end of the shaft 74. With the clutch elements 34 and 70 frictional, the return of all fingers 28 to their initial position may be effected by the common means described, because slippage of the clutch elements will simply occur in those instances where certain of the fingers 28 have been returned to zero before more advanced fingers are returned to zero.

The automatic operation of the graphing device 15 involves the data obtaining means 16 and the data classifying means 17 (see Fig. 4). When the apparatus is adapted, as herein, for governing an operation producing a plurality of like objects required to have a certain size, such, for example, as wrist pins 80, the data obtaining means 16 takes the form of a measuring gauge or mechanism. Herein this is diagrammatically illustrated by a pivotal arm 81 adapted to gauge the diameter of the wrist pins 80 as the same are presented thereto. Herein the wrist pins 80 are presented to the measuring gauge by an endless conveyor 82 having formed thereon at properly spaced intervals holders 83 for supporting the wrist pins. The conveyor is driven by a suitable drive wheel 84 from an electric motor 85 operating through reduction gearing represented at 86. The movement of the conveyor is intermittent and the purpose of such intermittent movement and the manner in which it is obtained will presently be described.

The data classifying means 17 functions to determine into which one of the plurality of ranges the data obtained from measurement of a particular wrist pin should fall, and hence acts selectively to advance an appropriate one of the fingers 28. Herein the classifying means is diagrammatically represented as comprising a plurality of stationary contacts 87 arranged in equally spaced, arcuate position. The number of such contacts 87 herein is seven, being one for each solenoid and hence each finger 28. Adapted to cooperate with the contacts 87 is a pivotal switch arm 88 associated with the pivotal arm 81 of the measuring gauge to be swung through different arcs dependent upon the size of the particular wrist pin being measured. Each of the contacts 87 is by a lead 88 connected to one of the solenoids 49 with the solenoids in turn connected to a common lead 89 extending to a suitable source of electrical energy indicated at S. The circuit for the solenoids 49 is completed through the switch arm 88 and other switches now to be described.

It has already been stated that the conveyor 82 is driven intermittently. Such intermittent drive of the conveyor 82 presents a wrist pin 80 to the measuring means 16 and then pauses for a predetermined short interval of time to permit the data classifying means 17 to function and, through the solenoids 49 and associated ratchet mechanism, translate the data obtained by the means 16 into an advance of the appropriate finger 28. In order that the means 17 may cause energization of the solenoids 49 selectively in accordance with the data obtained, a control system is provided, which system governs the intermittent advance of the conveyor 82.

This control system includes a master controller, generally designated 90, comprising a plurality of switches 91, 92 and 93 controlled, respectively, by cams 94, 95 and 96. These cams are all fixed on a common rotatable shaft 97 driven by an electric motor 98 through suitable reduction gearing represented at 99. One contact of the switch 91 is by a lead 100 connected to the source S, while the other contact is by a lead 101 connected to the switch arm 88 of the classifying means 17 to complete the circuit for the solenoids 49. Branching from the lead 100 is a lead 102 connected to one contact of the switch 92, while the other contact of this switch is by lead 103 connected to the stationary contact 104 of a switch 105. The movable contact 106 of the switch 105 is by a lead 107 connected to one terminal of the electric motor 85, while the other terminal of this motor is by a lead 108 connected to the lead 89 and hence to the source S. The switch 93 is connected in parallel with the switch 105 and to that end has one contact connected by a lead 109 to the lead 103, while the other contact is by a lead 110 connected to the lead 107. The electric motor 98 likewise receives its energy from the source S, being connected to the leads 89 and 100, respectively, through leads 111 and 112. A manually operable switch 113 controls the entire system. The switch 105 is controlled by cams 114 carried by the drive wheel 84, the cams being so spaced as to open the switch 105 and arrest movement of the conveyor 82 when a wrist pin 80 is moved into precise gauging position beneath the data obtaining means 16. The cams 94, 95 and 96 are so shaped and have such relative angular position that the switch 91 is temporarily closed after the switch arm 88 has come to rest in engagement with a particular one of the contacts 87 to momentarily complete the circuit to one of the solenoids 49 and then again break the circuit before the switches 92 and 93 are closed to complete a circuit around the switch 105 for initiating operation of the motor 85 and movement of the conveyor 82. This will all become more apparent from the brief description of the operation of the apparatus.

Means is provided for making a permanent record of the graph depicted by the heads 29 of the fingers 28. To that end the fingers 28 are made of such length that the heads 29 project somewhat above the rectangular, depressed portion 22a. Hingedly connected to the rear end of the casing 20 is a cover 120 adapted to fit within the rectangular, depressed portion 22a and bear against the heads 29. Thus, by placing a sheet of carbon paper over the heads 29 with the carbon side up and then placing over the carbon paper a piece of graph paper face downwardly and closing the cover, an impression of the heads 29 will be formed on the graph paper. As more fully pointed out in my previously mentioned application Serial No. 436,020, it is at times desirable to have the cover 120 transparent and a normal or ideal curve formed thereon with which comparison of the curve depicted by the heads 29 can be made.

It will be apparent that where the graph is taken directly from the graphing device, the variation in the ordinate factor is limited to the three factors obtainable by the stepped plates 52. It is desirable that the ordinate factor be variable to any desired degree and to an extent not obtainable by mechanical means, in order that the ordinate values may be proportionately increased or decreased to facilitate comparison with other graphs plotted to a different ordinate scale. To that end, electrical means is provided herein whereby the position of the finger 28 is indicated by a relative voltage value, and wherein this relative voltage value of all of the fingers 28 may be simultaneously adjusted upwardly or downwardly to magnify or reduce ordinate readings. Herein such means includes a plurality of resistors 121 mounted one beneath and parallel with each of the shafts 31. The rods 122 upon which wires forming the resistors are wound are conveniently supported in the frame 32. Carried by each finger 28 in insulated relation thereto is a wiper contact 123 engaging in electrical contact the resistor 121. These resistors (see Fig. 5) are connected in parallel between leads 124 and 125. The lead 124 is connected to one end terminal of a potentiometer 126, while the lead 125 is connected to the movable contact 127 of the potentiometer. A fixed voltage is impressed across the potentiometer 126 by suitable means such as a battery 128. Each of the wiper contacts 123 is by a lead 129 connected respectively to one of a plurality of arcuate contacts 130 forming part of a distributor switch generally designated 131. This switch is completed by a rotatable switch arm 132 connected by a lead 133 to one terminal of a recording volt meter or potentiometer 134, which may be of any conventional construction. The other terminal of the volt meter or potentiometer is by a lead 135 connected to the lead 124 intermediate the potentiometer 126 and the first resistor 121. The recording volt meter or potentiometer has a stylus 136 adapted to have a straight line movement and to record its movement on a suitable graph paper 137. The graph paper is adapted to be advanced step-by-step (downwardly as viewed in Fig. 5) as the switch arm 132 is advanced from its dotted line position counterclockwise to the full line position. To that end a shaft 138 is associated with the switch arm 132 to be rotated a predetermined amount and in the appropriate direction as movement of the switch arm from one contact to the adjacent contact 130 takes place. This shaft 138 carries a bevel 139 meshing with a bevel gear 140 fast on a shaft 141 projecting from a roller 142 over which the graph paper 137 runs. Preferably the roller 142 has pins 143 that engage in apertures 144 formed either directly in the graph paper or in some apron or belt to which the graph paper is secured.

It is believed readily apparent that the movement given to the stylus 136 of the recording volt meter will, of course, be proportional to the position of the wiper contact 123 on the resistor 121. If it is desired to vary the ordinate factor of all of the fingers 28 simultaneously, it is only necessary to vary the voltage that is impressed across the resistors 121 by adjusting the contact 127. In the operation of this means, the switch arm 132 is moved to the first of the contacts in a counterclockwise direction from the dotted line position of the switch arm, the switch closed to complete the circuit and thereby cause the stylus 136 to mark on the graph paper 137 a line proportional in length to the position of the corresponding finger 28. The switch is then opened, permitting the stylus 136 to return to its normal position and the switch arm 132 then swung counterclockwise to the next contact. Such swinging of the switch arm 132 rotates the shaft 138 and rotates the roller 142 to advance the graph paper a predetermined distance. The switch is then again closed to complete a circuit including the second one of the resistors 121, whereupon the stylus 136 will make a record as heretofore described. It is at times desirable to provide a reading volt meter 145 connected in parallel with the recording volt meter 134.

In briefly describing the operation of the apparatus, let it be assumed that all of the fingers 28 have through manipulation of the crank 71 been returned to zero position; that the frame 32 through the medium of the lever 73 has been shifted to engage the clutch elements 33 and 36; and that the lever 55 has been moved to adjust the plates 52 to determine the appropriate advance to be given each finger 28 upon actuation of its associated lever 43. Let it also be assumed that a measure of the characteristic to be observed, herein the diameters of the wrist pins 80, has been divided into a plurality of equal ranges preferably including the minimum and maximum diameters that will be tolerated, and these ranges assigned to the subdivisions 25 and hence the fingers 28. The switch 113 is then closed. This will initiate operation of the motor 98, which will thereafter continue to operate until the switch 113 is again opened. The motor 85 will be intermittently energized to advance the conveyor 82 step-by-step. Inasmuch as there are as yet no wrist pins in the holders 83, the switch arm 88 remains in an extreme position counterclockwise of and out of contact with any of the contacts 87. As the next step, a sample lot of the wrist pins 80 is taken and placed on the conveyor 82 to be presented successively to the data obtaining and classifying means 16, 17. As the first of such sample lot of wrist pins is brought to precise gauging position at the means 16, one of the cams 114 opens the switch 105 to break the circuit for the motor 85. This circuit is at that time composed of lead 108, motor 85, lead 107, switch 105, lead 103, switch 92, and leads 102 and 100, the switch 92 being held closed by the cam 95 throughout and beyond the period of operation required to advance the conveyor the distance between adjacent holders 83. By such movement of a wrist pin into gauging position the switch arm 88 will be swung into engagement with some one of the contacts 87, depending upon the range into which the measurement of the particular wrist pin falls. After the switch arm 88 has come to rest, cam 94 closes switch 91 to complete the energizing circuit for the particular one of the solenoids 49 then in circuit, dependent upon the position of the switch arm 88. Energization of the solenoid will actuate the lever 43 associated therewith which will then, through the motion translating mechanism described, translate this energization of a solenoid 49 into an advance of the corresponding finger 28. This completion of the energizing circuit for some one of the solenoids 49 is very brief with the switch 91 again opening before any movement is imparted to the conveyor 82. After the switch 91 opens, cam 96 closes switch 93 to complete a circuit around the switch 105. This switch 93 is held closed until cam 95 closes switch 92 to complete a starting circuit for the motor 85, this starting circuit including the switch 92 and the switch 93 which, as previously stated, is in parallel with the switch 105 to form a shunt circuit around the switch 105 and permit starting of the motor 85 while the switch 105 is open. The conveyor 82 is then by the motor 85 advanced to present the next wrist pin to the data obtaining means 16. During this advance and prior to the time that the next wrist pin is in gauging position at the means 16, the switch 93 is opened to return control of the motor 85 to the switch 105. The conveyor is then again arrested with a wrist pin in gauging position and the operation just described is repeated to advance a selected one of the fingers 28 in accordance with the measurement of the wrist pin then being gauged. These operations are repeated until the desired number of wrist pins have been checked and the data graphed. As a result the fingers may take the positions shown in Fig. 1 wherein the heads 29 represent points on a graph of the character shown in Figs. 6 and 8. The resultant graph may then be compared as to the position of its true average line, or as to the ordinate value of some abscissa point near the abscissa point of the true average value of some previous, normal or ideal graph. Such a normal or ideal graph might be carried on the lid 120 of the graphing device, as previously described. Preferably, however, a record is made of the graph for comparison with a graph resulting from a subsequent sampling of the products of the operation being supervised. Such a permanent record may be obtained directly from the heads 29 as described, or may, through the means of Fig. 5, be obtained on an adjusted scale.

After such a record has been obtained, if it is desired, a second sampling of wrist pins 80 is taken and run past the gauging and classifying means and the data so obtained graphed, as heretofore described. This subsequent graph may then be reproduced on the same sheet of paper as the first graph, or on a separate sheet and the graphs compared as previously mentioned. It is possible that the graphs may result in curves such as disclosed in Fig. 8, and by noting the difference in certain ordinate values or in the shift of the true average line an increase in oversize wrist pins may be predicted. Steps would then be taken to correct that condition in the manufacturing operation tending toward this production of oversize wrist pins.

I claim as my invention:

1. An apparatus for use in supervising a manufacturing operation designed for the production of a uniform product required to have at least one characteristic fall within specified limits comprising, in combination, a mechanical graphing device having a plurality of indicators uniformly spaced along an axis representing one of the axes of a coordinate axis graph with each indicator representing the midpoint of a plurality of equal ranges of a measure of the particular characteristic to be observed, said indicators being movable in paths normal to the first named axis, actuating means for each of said indicators including a solenoid operable upon successive actuations to advance an indicator step-by-step, a checking means operable upon presentation of a unit of the finished product thereto to obtain data as to the particular characteristic being observed, and an electrical circuit including said solenoids and a data classifying means including a plurality of stationary contacts connected one to each of said solenoids and a movable contact associated with said checking means selectively to complete the circuit to one of said solenoids in accordance with the classification given to the data obtained by said checking means.

2. An apparatus for use in supervising a manufacturing operation designed for the production of a uniform product required to have at least one characteristic fall within specified limits comprising, in combination, a mechanical graphing device having a plurality of indicators uniformly spaced along an axis representing one of the axes of a coordinate axis graph with each indicator representing the midpoint of a plurality of equal ranges of a measure of the particular characteristic to be observed, said indicators being movable in paths normal to the first named axis, actuating means for each of said indicators including a solenoid operable upon successive actuations to advance an indicator step-by-step, a checking means operable upon presentation of a unit of the finished product thereto to obtain data as to the particular characteristic being observed, conveyor means presenting successive units to said checking means, drive means for said conveyor means, data classifying means operatively associated with said checking means to indicate into which one of the plurality of ranges the data obtained falls, said classifying means including a plurality of stationary contacts each electrically connected to one of said solenoids and a movable switch arm selectively engaging one of said plurality of contacts in accordance with the classification of the data obtained by said checking means, and an electrical control circuit governing said driving means intermittently to advance said conveyor means successively to present units of the finished product to said checking means and momentarily to complete a circuit including said data classifying means during a period of non-movement of said conveyor means.

3. An apparatus for use in supervising a manfacturing operation designed for the production of a uniform product required to have at least one characteristic fall within specified limits comprising, in combination, a mechanical graphing device having a plurality of indicators uniformly spaced along an axis representing one of the axes of a coordinate axis graph with each indicator representing the midpoint of a plurality of equal ranges of a measure of the particular characteristic to be observed, said indicators being movable in paths normal to the first named axis, actuating means for each of said indicators including a solenoid operable upon successive actuations to advance an indicator step-by-step, a checking means operable upon presentation of a unit of the finished product thereto to obtain data as to the particular characteristic being observed, conveyor means presenting successive units to said checking means, drive means for said conveyor means, data classifying means operatively associated with said checking means to indicate into which one of the plurality of ranges the data obtained falls, said classifying means including a plurality of stationary contacts each electrically connected to one of said solenoids and a movable switch arm selectively engaging one of said plurality of contacts in accordance with the classification of the data obtained by said checking means, and an electrical control circuit comprising a first switch and governing means therefor driven in timed relation with the movement of said conveyor means to arrest operation of said conveyor means with a unit in position to be gauged by said checking means, and a master controller governing completion of a circuit to one of said solenoids preconditioned by said data classifying means and initiation of movement of said conveyor means for presenting a successive unit to said checking means.

4. An apparatus for use in supervising a manufacturing operation designed for the production of a uniform product required to have at least one characteristic fall within specified limits comprising, in combination, a mechanical graphing device having a plurality of indicators uniformly spaced along an axis representing one of the axes of a coordinate axis graph with each indicator representing the midpoint of a plurality of equal ranges of a measure of the particular characteristic to be observed, said indicators being movable in paths normal to the first named axis, actuating means for each of said indicators including a solenoid operable upon successive actuations to advance an indicator step-by-step, a checking means operable upon presentation of a unit of the finished product thereto to obtain data as to the particular characteristic being observed, conveyor means presenting successive units to said checking means, drive means for said conveyor means, electric data classifying means operatively associated with said checking means to indicate into which one of the plurality of ranges the data obtained falls, and an electrical control circuit governing said driving means intermittently to advance said conveyor means successively to present units of the finished product to said checking means and momentarily to complete a circuit including said data classifying means during a period of non-movement of said conveyor means.

HERBERT ZIEBOLZ.